(12) United States Patent
Ishida et al.

(10) Patent No.: US 11,796,361 B2
(45) Date of Patent: Oct. 24, 2023

(54) FLOW RATE MEASUREMENT APPARATUS MEASURING FLOW RATE OF FLUID INSIDE PIPE HAVING PREDETERMINED CROSS-SECTIONAL AREA

(71) Applicant: OMRON Corporation, Kyoto (JP)

(72) Inventors: Yui Ishida, Nara (JP); Naoki Yoshitake, Kusatsu (JP); Yoshitaka Tsurukame, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 128 days.

(21) Appl. No.: 17/273,952

(22) PCT Filed: Mar. 11, 2019

(86) PCT No.: PCT/JP2019/009564
§ 371 (c)(1),
(2) Date: Mar. 5, 2021

(87) PCT Pub. No.: WO2020/161927
PCT Pub. Date: Aug. 13, 2020

(65) Prior Publication Data
US 2021/0356304 A1 Nov. 18, 2021

(30) Foreign Application Priority Data
Feb. 5, 2019 (JP) .................................. 2019-018701

(51) Int. Cl.
*G01F 1/66* (2022.01)
*G01F 1/667* (2022.01)
(Continued)

(52) U.S. Cl.
CPC .............. *G01F 1/667* (2013.01); *G01F 1/662* (2013.01); *G01F 1/7082* (2013.01); *G01F 1/712* (2013.01)

(58) Field of Classification Search
None
See application file for complete search history.

(56) References Cited

U.S. PATENT DOCUMENTS

| 2004/0006436 A1 | 1/2004 | Morgen et al. |
| 2010/0000331 A1 | 1/2010 | Gysling |

(Continued)

FOREIGN PATENT DOCUMENTS

| JP | 2003302416 A | 10/2003 |
| JP | 2005037290 A | 2/2005 |

(Continued)

OTHER PUBLICATIONS

EPO Extended European Search Report for corresponding EP Application No. 19914612.7; dated Sep. 22, 2022.
(Continued)

*Primary Examiner* — Harshad R Patel
(74) *Attorney, Agent, or Firm* — CANTOR COLBURN LLP

(57) ABSTRACT

A flow rate measurement apparatus includes first and second transducers provided at different positions in a longitudinal direction of a pipe, the at least two transducers including first and second transducers. The flow rate measurement apparatus further includes a transmitter and receiver. The transmitter transmits a transmission signal, which is an ultrasonic signal having a band wider than the ultrasonic signal, or a plurality of ultrasonic signals having a plurality of different frequency ranges. The receiver separates a target signal passing through a fluid from the received signal by utilizing that an attenuation rate of the ultrasonic signal in the fluid in a predetermined frequency band is different from an attenuation rate of the ultrasonic signal in the pipe in the frequency band, and measures a flow rate based on a separated target signal.

4 Claims, 12 Drawing Sheets

(51) Int. Cl.
    *G01F 1/7082*     (2022.01)
    *G01F 1/712*     (2006.01)

(56) References Cited

U.S. PATENT DOCUMENTS

| | | |
|---|---|---|
| 2011/0209558 A1 | 9/2011 | Sugiura et al. |
| 2017/0268915 A1 | 9/2017 | Gestner et al. |

FOREIGN PATENT DOCUMENTS

| | | |
|---|---|---|
| JP | 2009085972 A | 4/2009 |
| JP | 2010216872 A | 9/2010 |
| JP | 2011179940 A | 9/2011 |

OTHER PUBLICATIONS

International Search Report for International Application No. PCT/JP2019/009564; dated May 28, 2019.
PCT Written Opinion of the International Searching Authority for International Application No. PCT/JP2019/009564 dated May 28, 2019.

T41

T42

FLOW RATE MEASUREMENT APPARATUS MEASURING FLOW RATE OF FLUID INSIDE PIPE HAVING PREDETERMINED CROSS-SECTIONAL AREA

CROSS REFERENCE TO RELATED APPLICATIONS

This is the U.S. national stage of application No. PCT/JP2019/009564, filed on Mar. 11, 2019. Priority under 35 U.S.C. § 119(a) and 35 U.S.C. § 365(b) is claimed from Japanese Application No. 2019-018701, filed Feb. 5, 2019, the disclosure of which is also incorporated herein by reference.

TECHNICAL FIELD

The present invention relates to a flow rate measurement apparatus configured to measure a flow rate of a fluid inside a pipe having a predetermined cross-sectional area.

BACKGROUND ART

For example, Patent Document 1 discloses an ultrasonic flowmeter having improved measurement accuracy and configured as follows. The ultrasonic flowmeter includes a transmitter that transmits an ultrasonic signal; a drive circuit that drives the transmitter, a receiver that receives an ultrasonic signal transmitted from the transmitter and propagated through a fluid; a reception detection circuit that receives an output of the receiver and detects the ultrasonic signal; a timer that measures the propagation time of the ultrasonic signal; a calculator that calculates a flow rate from an output of the timer; and a drive frequency changing unit that changes a drive frequency of the drive circuit. Thus, the drive frequency changing unit temporally changes the drive frequency of the transmitter to perform transmission, which varies, disperses, and averages an influence of reverberation and reflected waves on the received signal, and eliminates a bias of measurement errors.

Further, for example, Patent Document 2 discloses an ultrasonic flowmeter capable of increasing reception sensitivity of reflected waves to improve the accuracy of measurement. The ultrasonic flowmeter includes an ultrasonic transmitter that allows an ultrasonic pulse of a predetermined frequency to be incident from an ultrasonic transducer into a fluid to be measured in a fluid pipe along a measurement line, a fluid velocity distribution measurer that receives an ultrasonic echo reflected from a measurement region of the ultrasonic pulse incident into the fluid to be measured and measures a flow velocity distribution of the fluid to be measured in the measurement region, and a flow rate calculator that calculates the flow rate of the fluid to be measured in the measurement region based on the flow velocity distribution of the fluid to be measured and measures a flow rate of the fluid to be measured.

PRIOR ART DOCUMENTS

Patent Documents

Patent Document 1: Japanese patent laid-open publication No. JP2009-085972A; and
Patent Document 2: International publication No. WO2005/064289A.

SUMMARY OF THE INVENTION

Problems to be Solved by the Invention

In the ultrasonic flowmeter of Patent Document 1, the drive frequency of the transmitter is changed temporally to perform transmission. This varies, disperses, and averages the influence of reverberation and reflected waves on the received signal, and eliminates the bias of measurement errors. However, this method is provided for reducing the errors in terms of probability by switching the frequency for each measurement, and has such a problem that numerous measurements are required and measurement time increases.

Further, in Patent Document 2, two ultrasonic vibrators are installed in two pipes to equalize angles of incidence on the pipes, and noise is removed by a difference between the respective measurement signals. There is such a problem that it is difficult to selectively remove a noise component because two ultrasonic sensors are required and a signal propagation method differs for each ultrasonic sensor by using the two ultrasonic sensors.

An object of the present invention is to solve the above problems and to provide a flow rate measurement apparatus capable of performing measurement in a simple method and reducing measurement time as compared with the prior art.

Another object of the present invention is to provide a flow rate measurement apparatus capable of measuring a flow rate with higher accuracy than the prior art even with noise.

Means for Solving the Problems

According to one aspect of the present invention, there is provided a flow rate measurement apparatus including at least two transducers provided at different positions in a longitudinal direction of a pipe, and the at least two transducers includes first and second transducers. Each of the first and second transducers that converts an electric signal into an ultrasonic signal or converts an ultrasonic signal into an electric signal. The flow rate measurement apparatus transmits an ultrasonic signal to at least one of the first and second transducers to another of the first and second transducers as a transmission signal, receives a received signal, separates a predetermined target signal based on a correlation coefficient between the received signal and a predetermined reference wave signal, and thereafter, measures a flow rate of a fluid inside the pipe based on the target signal. The flow rate measurement apparatus further includes a transmitter and a receiver. The transmitter transmits a transmission signal, which includes an ultrasonic signal having a band wider than the ultrasonic signal, or a plurality of ultrasonic signals having a plurality of different frequency ranges. The receiver separates a target signal passing through the fluid from the received signal by utilizing that an attenuation rate of the ultrasonic signal in the fluid in a predetermined frequency band is different from an attenuation rate of the ultrasonic signal in the pipe in the frequency band, and measures a flow rate based on a separated target signal.

In addition, in the above-mentioned flow rate measurement apparatus, the transmission signal has a first band and a second band higher than the first band, and the reference wave signal is set such that the second band of the transmission signal is attenuated as compared with the first band.

Further, in the above-mentioned flow rate measurement apparatus, the transmission signal has a first band and a second band higher than the first band. When the attenuation rate of the ultrasonic signal in the fluid in the predetermined frequency band is substantially identical to the attenuation rate of the ultrasonic signal in the pipe in the frequency band, and the target signal is inseparable by the receiver, then the transmission signal has a third band higher than the second band of the transmission signal.

Still further, in the above-mentioned flow rate measurement apparatus, the transmission signal has a first band and a second band higher than the first band. When the attenuation rate of the ultrasonic signal in the fluid in the predetermined frequency band is larger than the attenuation rate of the ultrasonic signal in the pipe in the frequency band by a predetermined threshold value, and the target signal is inseparable by the receiver, then the transmission signal has a fourth band lower than the first band of the transmission signal.

Effects of the Invention

Accordingly, according to the present invention, the flow rate measurement apparatus can measure the flow rate in a simple method, and reduce the measurement time as compared with the prior art. Further, even with noise, the flow rate can be measured with higher accuracy than in the prior art.

MODE FOR CARRYING OUT THE INVENTION

Hereinafter, an embodiment and a modification of the present invention will be described with reference to the drawings. The same or similar components are designated by the same reference signs.

Embodiments

Figure 1:
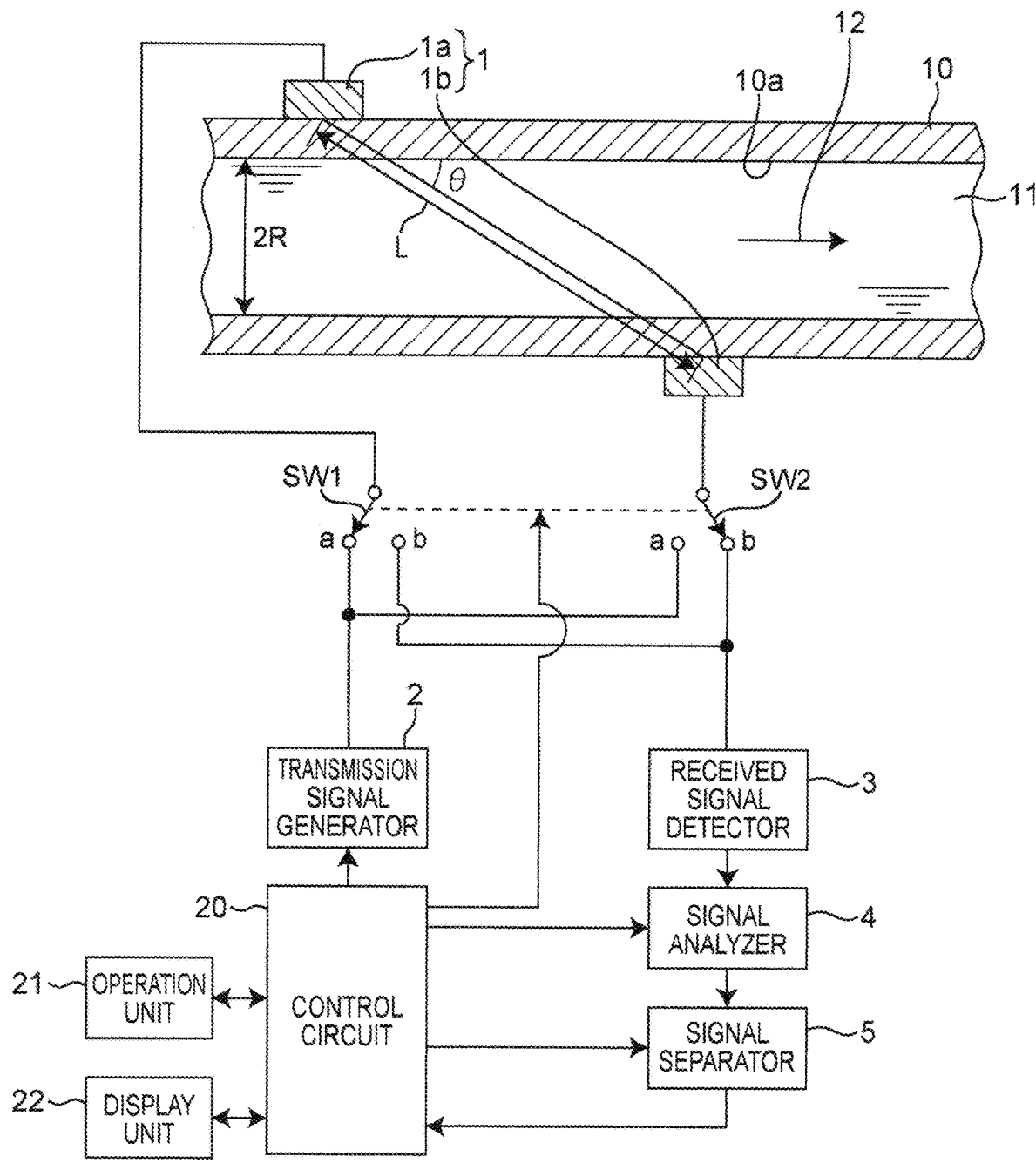
FIG. 1 is a block diagram of a configuration example of a flow rate measurement apparatus 50 according to an embodiment.

FIG. 1 is a block diagram of a configuration example of a flow rate measurement apparatus 50 according to the embodiment. The flow rate measurement apparatus 50 according to the present embodiment measures a flow rate of a fluid 11 inside a pipe 10 having a predetermined cross-sectional area. The fluid 11 may be a liquid or a gas. FIG. 1 shows a case where the pipe 10 has a circular cross-sectional shape having a diameter of 2R, but the pipe 10 may have any other cross-sectional shape.

Referring to FIG. 1, the flow rate measurement apparatus 50 includes an ultrasonic sensor 1 including transducers 1a and 1b provided at different positions in a flow direction 100-12 (longitudinal direction of the pipe 10) of the fluid 11 in the pipe 10. The transducers 1a and 1b convert an electric signal into an ultrasonic signal or convert an ultrasonic signal into an electric signal. The transducer 1a is connected to a transmission signal generator 2 via a terminal a of a switch SW1 and is connected to a received signal detector 3 via a terminal b of the switch SW1. Further, the transducer 1b is connected to the transmission signal generator 2 via a terminal a of a switch SW2 and is connected to the received signal detector 3 via a terminal b of the switch SW2. The transducers 1a and 1b are provided on the pipe 10 so as to have a distance L between each other in a direction of a straight line connecting centers of detection surfaces of the transducers 1a and 1b with an angle θ with respect to an inner surface 10a of the pipe 10.

The flow rate measurement apparatus 50 includes the ultrasonic sensor 1, the transmission signal generator 2, the received signal detector 3, a signal analyzer 4, a signal separator 5, a control circuit 20, an operation unit 21, and a display unit 22. Here, the operation unit 21 and the display unit 22 are connected to the control circuit 20, and the control circuit 20 executes an ultrasonic flow rate measurement process of FIG. 2 based on an operation using the operation unit 21 and displays a processing result on the display unit 22.

The flow rate measurement apparatus 50 transmits a transmission signal having a predetermined frequency and a predetermined time length via the fluid 11 inside the pipe 10 from the transmission signal generator 2 to the transducer 1b via the transducer 1a and from the transmission signal generator 2 to the transducer 1a via the transducer 1b. The signal analyzer 4 analyzes the received signal that is received by using a signal correlation method, calculates a correlation coefficient of an analysis result, and outputs the correlation coefficient to the signal separator 5. Based on the input correlation coefficient, the signal separator 5 separates a target signal from the detected received signal by using a predetermined signal separation method described later, and outputs the target signal to the control circuit 20.

Figure 2:
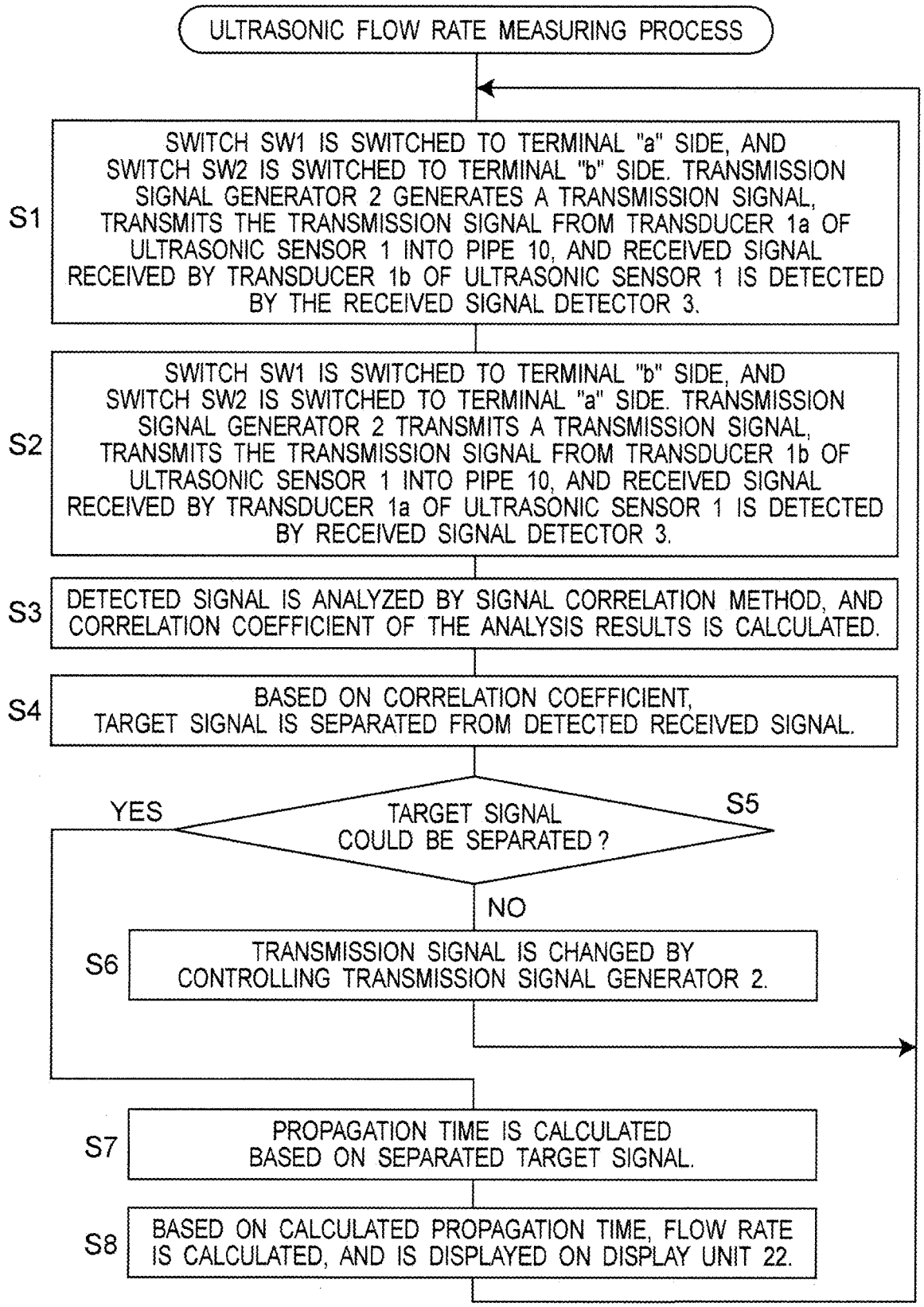
FIG. 2 is a flowchart of an ultrasonic flow rate measurement process executed by a control circuit 20 of FIG. 1.

FIG. 2 is a flowchart of the ultrasonic flow rate measurement process executed by the control circuit 20 of FIG. 1.

In step S1 of FIG. 2, the switch SW1 is switched to the terminal "a" side, and the switch SW2 is switched to the terminal "b" side. Then, the transmission signal is generated by using the transmission signal generator 2, the transmission signal is transmitted from the transducer 1a of the ultrasonic sensor 1 into the pipe 10, and the received signal received by the transducer 1b of the ultrasonic sensor 1 is detected by the received signal detector 3. Next, in step S2, the switch SW1 is switched to the terminal "b" side, and the switch SW2 is switched to the terminal "a" side. Then, the transmission signal is generated by using the transmission signal generator 2, the transmission signal is transmitted from the transducer 1b of the ultrasonic sensor 1 into the pipe 10, and the received signal received by the transducer 1a of the ultrasonic sensor 1 is detected by the received signal detector 3. In step S3, the signal analyzer 4 samples a transmission signal f(x) and a received signal g(x) detected by the signal analyzer 4 at discrete time m=1, . . . , M, and discretized signals f(m) and g(m) are obtained. The signals f(m) and g(m−n) are analyzed by using the signal correlation method, and the correlation coefficient of the analysis result is calculated. In this case, a correlation coefficient R(n) at the time n is calculated by, for example, the following equation:

$$R(n) = \frac{\sum_{m=1}^{M} f(m-n) \cdot g(m)}{\sqrt{\sum_{m=1}^{M} f^2(m-n) \cdot \sum_{m=1}^{M} g^2(m)}}.$$ [Equation 1]

The time n when the correlation coefficient R(n) reaches a peak value indicates a moment when a measurement signal is received.

Then, the target signal is separated from the detected received signal based on the correlation coefficient calculated in step S4.

In step S5, it is determined whether the target signal can be separated. If YES, the process proceeds to step S7, and if NO, the process proceeds to step S6. In step S6, the transmission signal generator 2 is controlled, the transmission signal is changed as described in detail later, the process returns to step S1, and the above process is repeated. Meanwhile, in step S7, the propagation time is calculated based on the separated target signal. The method of calculating the propagation time is as follows.

When a velocity of the fluid 11 is v and a speed of sound is c, propagation time Ta of the ultrasonic wave transmission signal from the transducer 1a to the transducer 1b is expressed by the following equation:

$Ta = L/(c + v \cdot \cos θ)$.

The propagation time Tb of the ultrasonic wave transmission signal from the transducer 1b to the transducer 1a is expressed by the following equation:

$Tb = L/(c − v \cdot \cos θ)$.

Therefore, the velocity v of the fluid 11 is expressed by the following equation:

$$v = \frac{L}{2\cos θ}\left(\frac{1}{Ta} - \frac{1}{Tb}\right).$$ [Equation 2]

A flow rate Q of the fluid 11 is expressed by the product of a cross-sectional area of the pipe 10 and the velocity v of the fluid 11. Therefore, in the example of FIG. 1, the flow rate Q of the fluid 11 is expressed by the following equation:

$Q = πr^2 v$.

Referring to FIG. 2 again, in step S8, the flow rate is calculated based on the calculated propagation time and displayed on the display unit 22, and the process returns to step S1.

Referring to FIG. 2, the case where the flow rate of the fluid 11 is calculated based on the propagation time of the measurement signal is described. Alternatively, the flow rate of the fluid 11 may be calculated based on a Doppler shift generated in the measurement signal. The frequency of the transmitted measurement signal is fa and the frequency of the received measurement signal is fb. The frequency fb is expressed by the following equation:

$fb = fa \times (c + v \cdot \cos θ)/(c − v \cdot \cos θ)$.

The velocity v of the fluid 11 is expressed by the following equation:

$v = c/(2 \cos θ) \cdot (fb − fa)/fb$.

Therefore, in the example of FIG. 1, the flow rate Q of the fluid 11 is expressed by $Q = πr^2 v$. In this case, the measurement signal may be transmitted in only one direction between the transducers 1a and 1b. When the measurement signal includes a plurality of frequencies, the flow rate of the fluid 11 can be also calculated in substantially the same manner as described above.

Figure 3A:
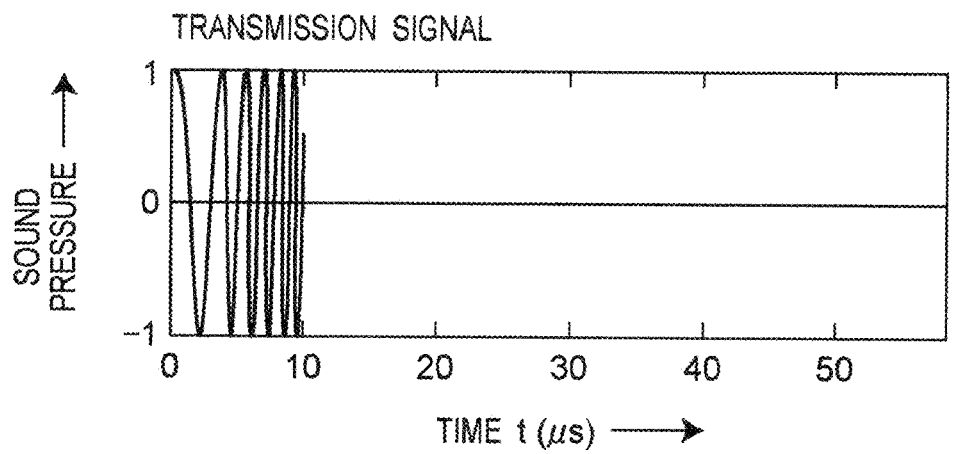
FIG. 3A is a waveform diagram of an example of a transmission signal transmitted from the flow rate measurement apparatus of FIG. 1.
Figure 3B:
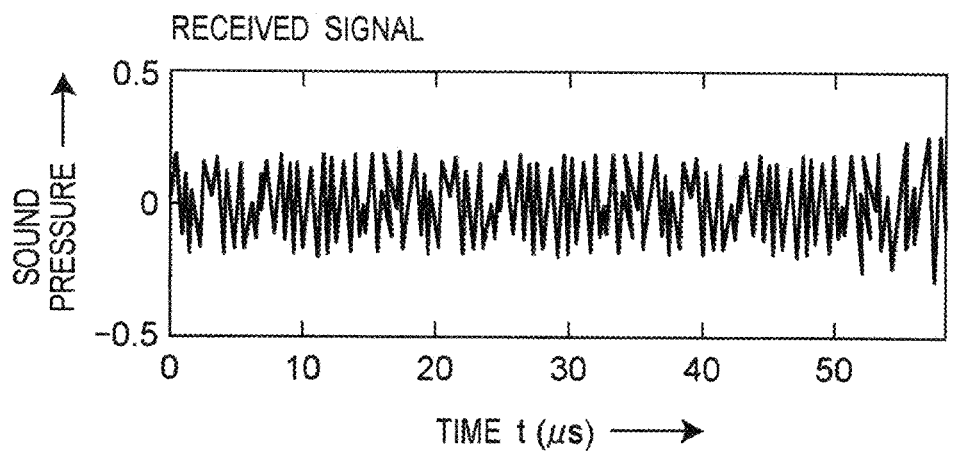
FIG. 3B is a waveform diagram of an example of a received signal received by the flow rate measurement apparatus of FIG. 1.
Figure 3C:
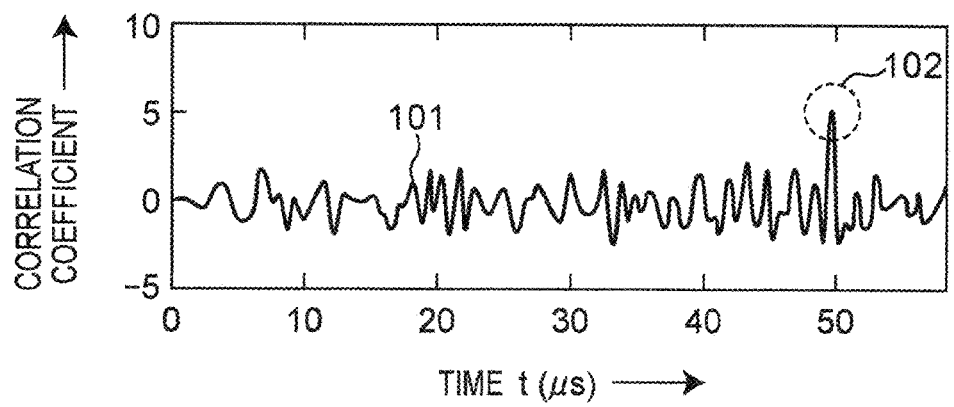
FIG. 3C is a waveform diagram of an example of a correlation coefficient calculated by the flow rate measurement apparatus of FIG. 1.
Figure 3D:
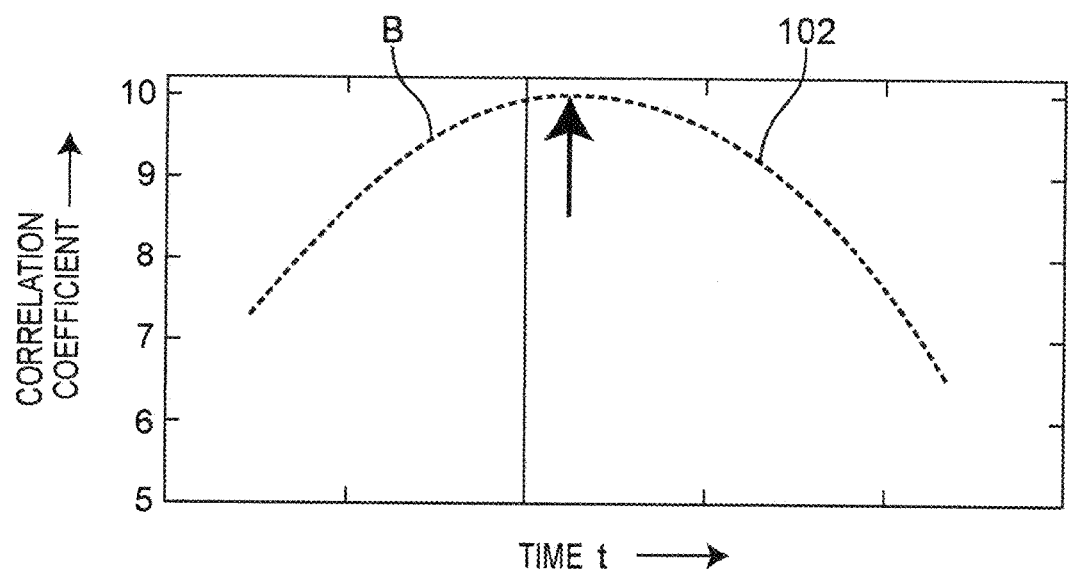
FIG. 3D is an enlarged diagram of a signal part 102 of FIG. 3C.
Figure 3E:
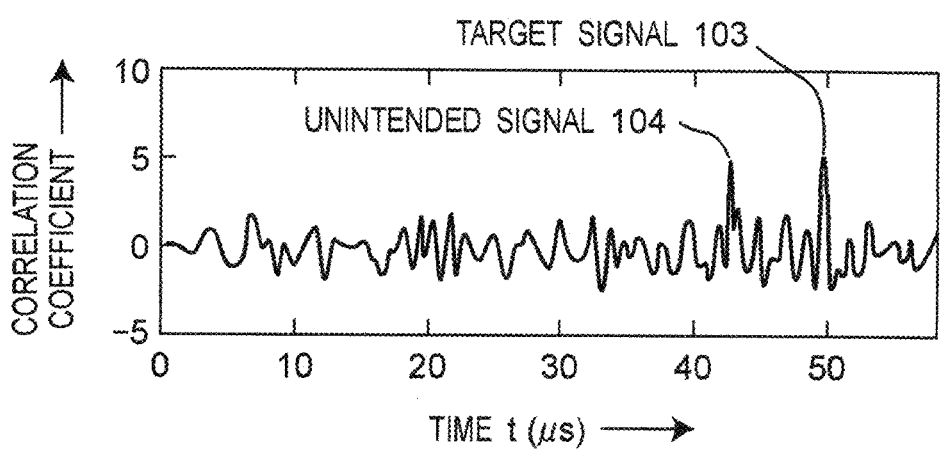
FIG. 3E is a waveform diagram of a correlation coefficient, showing a problem in a conventional example.

FIG. 3A is a waveform diagram of an example of a transmission signal transmitted from the flow rate measurement apparatus of FIG. 1, and FIG. 3B is a waveform diagram of an example of a received signal received by the flow rate measurement apparatus of FIG. 1. Further, FIG. 3C is a waveform diagram of an example of the correlation coefficient (signal 101) calculated by the flow rate measurement apparatus of FIG. 1, and FIG. 3D is an enlarged diagram of a signal part 102 of FIG. 3C. Further, FIG. 3E is a waveform diagram of the correlation coefficient showing problems in the conventional example.

For example, when the frequency-modulated broadband ultrasonic signal (FIG. 3A) is transmitted as a transmission signal, the correlation coefficient (FIGS. 3C and 3D) between the received signal having received (FIG. 3B) and the transmission signal as the reference waveform is calculated by the signal correlation method to obtain arrival time of the target signal. It is noted that the received signal may be used as the reference waveform. In this case, the ultrasonic transmission signal propagates in the pipe 10, but there may be the path from the ultrasonic transmission through the pipe to the ultrasonic reception as well as the path from the ultrasonic transmission through the pipe to the fluid through the pipe to the ultrasonic reception. As shown in FIG. 3E, in addition to a target signal 103, an unintended signal 104 is also received. Therefore, during a correlation process, a correlation peak of the unintended signal 104 may appear. In the present embodiment, the target signal is separated by the signal analyzer 4 in order to solve this problem.

Figure 4A:
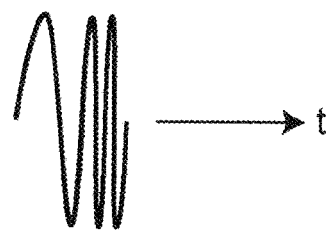
FIG. 4A is a waveform diagram of an example of a transmission signal T41 including a broadband ultrasonic wave, which is a transmission signal used in the embodiment.
Figure 4B:
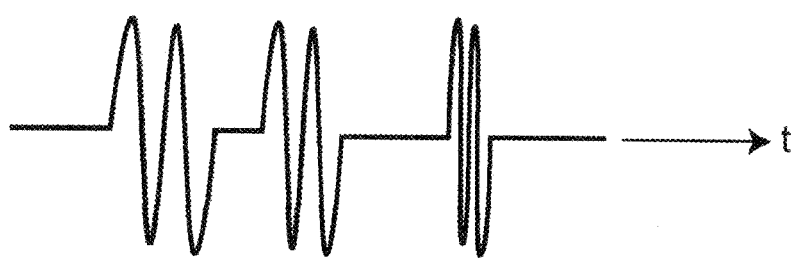
FIG. 4B is a waveform diagram of an example of a transmission signal T42 including a plurality of broadband ultrasonic waves having different frequency ranges, which is a transmission signal used in the embodiment.

FIG. 4A is a waveform diagram of an example of the transmission signal T41 including a broadband ultrasonic wave, which is a transmission signal used in the embodiment, and FIG. 4B is a waveform diagram of an example of a transmission signal T42 including a plurality of broadband ultrasonic waves having different frequency ranges, which is a transmission signal used in the embodiment.

In the present embodiment, the target signal is specified from the received signal that has passed through the fluid 11 using the broadband ultrasonic signal (FIG. 4A) or the plurality of ultrasonic signals having different frequency ranges (FIG. 4B) to enhance accuracy of the flow rate.

As is known, an attenuation coefficient α of ultrasonic waves in a fluid such as a liquid is expressed by the following equation:

$$\alpha = \frac{2\pi^2 f^2}{\rho c^3}\left(K + \frac{4}{3}\eta\right).$$ [Equation 3]

In this case, f is a frequency, K is a bulk viscosity, and η is a shear viscosity. As is clear from the above equation, the attenuation coefficient α is proportional to $f^2$.

In the present embodiment, a predetermined target signal is separated by utilizing a difference in the attenuation characteristics of ultrasonic waves in the pipe 10 and the fluid 11, that is, a difference in an attenuation rate of the frequency for each propagating substance. For example, the attenuation of high frequency components in the fluid 11 is utilized. Specifically, as a signal separation method, it is determined by the correlation coefficient or by the ratio of the high frequency component and the low frequency component by fast Fourier transformation (FFT). That is, the difference in the attenuation characteristics of ultrasonic waves in the pipe 10 and in the fluid 11 is utilized, and appearance of the characteristics in the target signal is utilized.

Figure 5A:
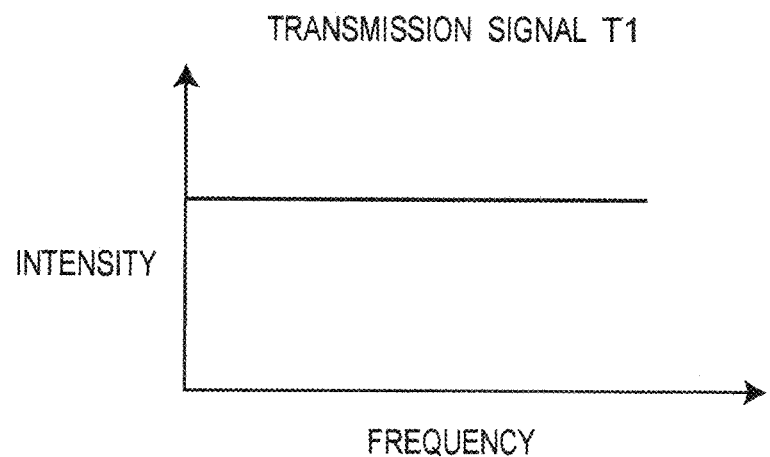
FIG. 5A is a waveform diagram of an example of a transmission signal T1, showing a method of separating a target signal in the embodiment.
Figure 5B:
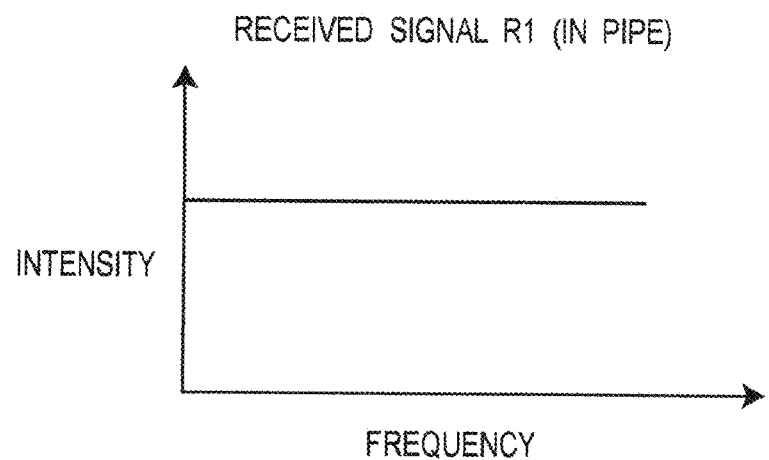
FIG. 5B is a waveform diagram of an example of a received signal R1 in a pipe, showing a method of separating a target signal in the embodiment.
Figure 5C:
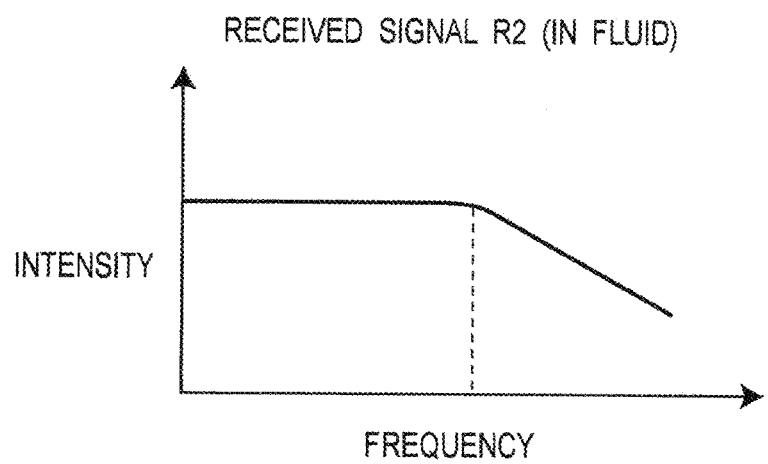
FIG. 5C is a waveform diagram of an example of a received signal R2 in a fluid, showing a method of separating a target signal in the embodiment.

FIG. 5A is a waveform diagram of an example of a transmission signal T1, showing the method of separating the target signal in the embodiment. Further, FIG. 5B is a waveform diagram of an example of a received signal R1 in the pipe 10 such as a steel pipe, showing the method of separating a target signal in the embodiment, and FIG. 5C is a waveform diagram of an example of a received signal R2 in the fluid 11 such as a liquid, showing the method of separating a target signal in the embodiment. When the transmission signal shown in FIG. 5A is transmitted, a difference appears in the frequency characteristics of the received signals R1 and R2 between the pipe 10 such as a steel pipe and the fluid 11. The received signal R2 that has passed through the fluid 11 is the target signal as shown in FIG. 5C, and it is therefore determined that the target signal is separated in step S5 of FIG. 2 if the received signal R2 having the attenuation characteristic can be detected as shown in FIG. 5C, for example.

In the above embodiment, the received signal is separated by using the FFT, but the present invention is not limited to this. The signal may be separated by using short-time Fourier transformation (STFT) or a frequency filter such as a band-pass filter described below with reference to FIGS. 6A to 6C.

Figure 6A:
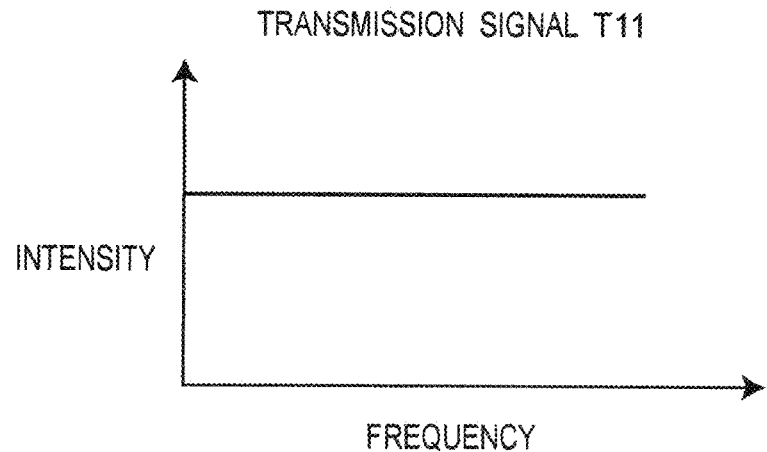
FIG. 6A is a waveform diagram of an example of a transmission signal T11, showing a method of separating a target signal in the embodiment.
Figure 6B:
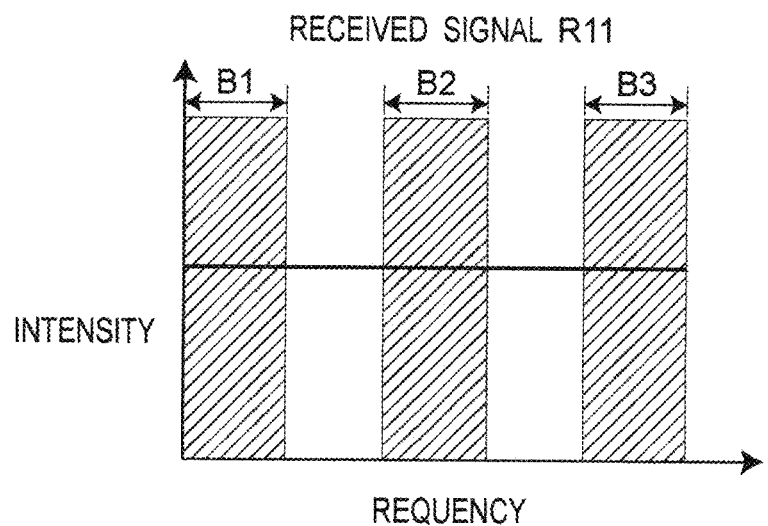
FIG. 6B is a waveform diagram of an example of a received signal R11, showing a method of separating a target signal in the embodiment.
Figure 6C:
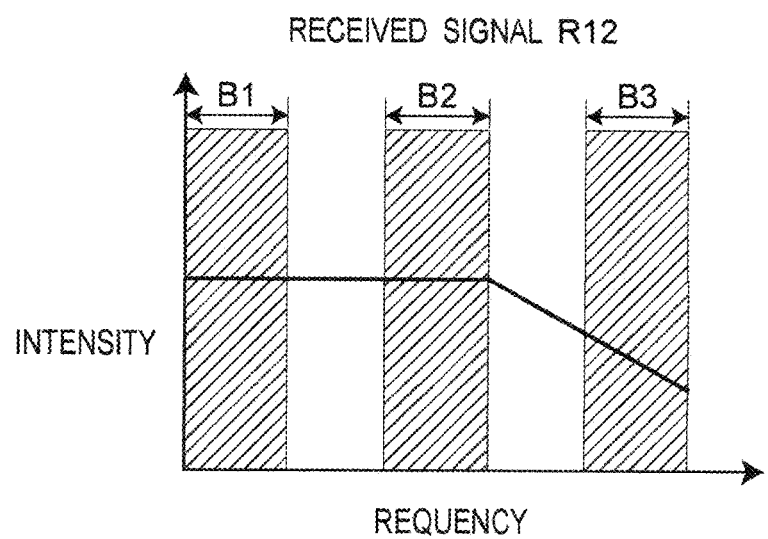
FIG. 6C is a waveform diagram of an example of a received signal R12, showing a method of separating a target signal in the embodiment.

FIG. 6A is a waveform diagram of an example of a transmission signal T11, showing the method of separating a target signal in the embodiment. Further, FIG. 6B is a waveform diagram of an example of a received signal R11, showing the method of separating a target signal in the embodiment, and FIG. 6C is a waveform diagram of an example of a received signal R12, showing the method of separating a target signal in the embodiment. In this separation method, the received signal R2 having the above attenuation characteristics may be detected by detecting an intensity or signal power at each passband width B1, B2, and B3 by using, for example, three band-pass filters having the passband widths B1, B2, and B3 separated from each other. This separation method can reduce calculation time as compared with the method using FFT or the like.

Figure 7A:
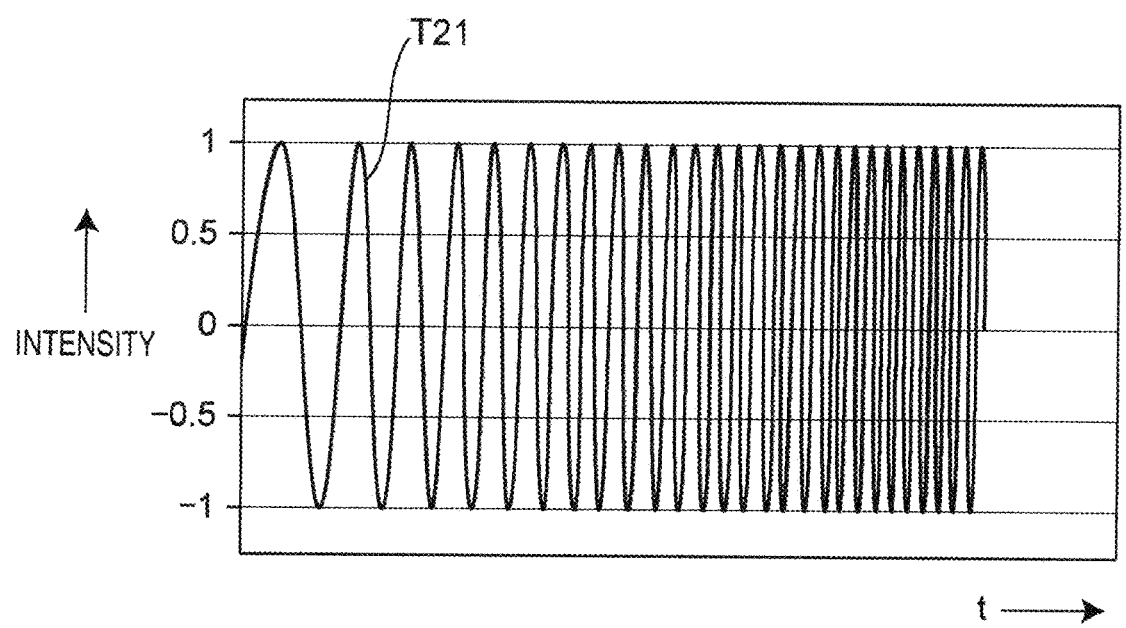
FIG. 7A is a waveform diagram of an example of a transmission signal T21 as a general correlation reference wave, showing a method of separating a target signal in the embodiment.
Figure 7B:
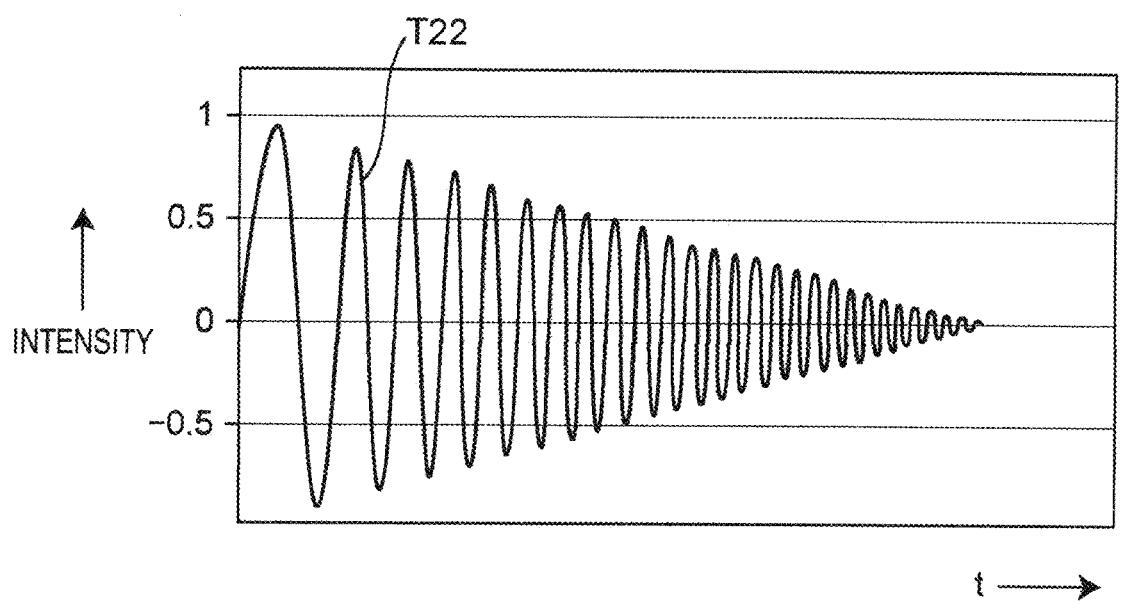
FIG. 7B is a waveform diagram of an example of a transmission signal T22 as a correlation reference including a waveform in which a high frequency is attenuated, showing a method of separating a target signal in the embodiment.

FIG. 7A is a waveform diagram of an example of a transmission signal T21 as a general correlation reference wave, showing the method of separating a target signal in the embodiment. Further, FIG. 7B is a waveform diagram of an example of a transmission signal T22 as a correlation reference including a waveform in which a high frequency is attenuated, showing the method of separating a target signal in the embodiment.

In general, when correlated with the transmission signal, the target received signal that has passed through the fluid 11 such as a liquid has a lower intensity on a high frequency side. Thus, a correlation value is lower than that of the unintended signal that has passed only through the pipe 10. Thus, as shown in FIG. 7B, by using a waveform signal in which a high frequency region is attenuated (referred to as a waveform signal in which a second band higher than a predetermined first band is attenuated) as a reference wave signal, the target signal that has passed through the fluid 11 such as a liquid is similar to the reference wave signal, and the correlation coefficient is higher than in general when the reference wave signal of FIG. 7A is used. This can improve the accuracy of the method of separating the signal as compared with in general when the reference wave signal of FIG. 7A is used.

Next, the method of changing the transmission signal (modification) when there is noise will be described below.

Figure 8A:
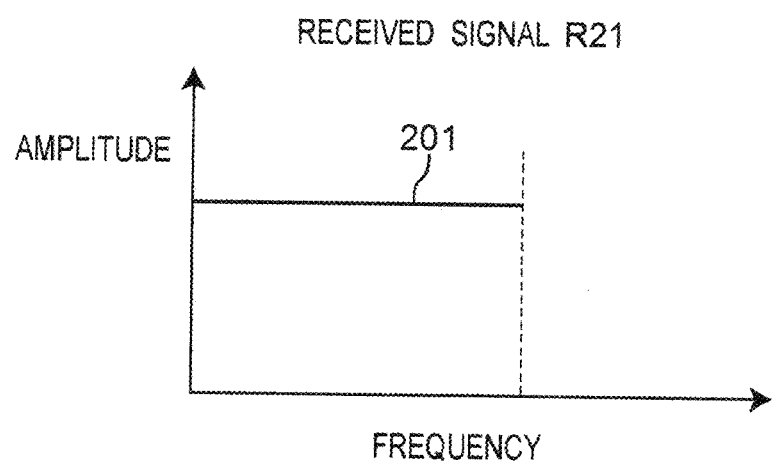
FIG. 8A is a waveform diagram of an example of a received signal R21 before a change, showing a first method of changing the transmission signal when there is noise in a modification.
Figure 8B:
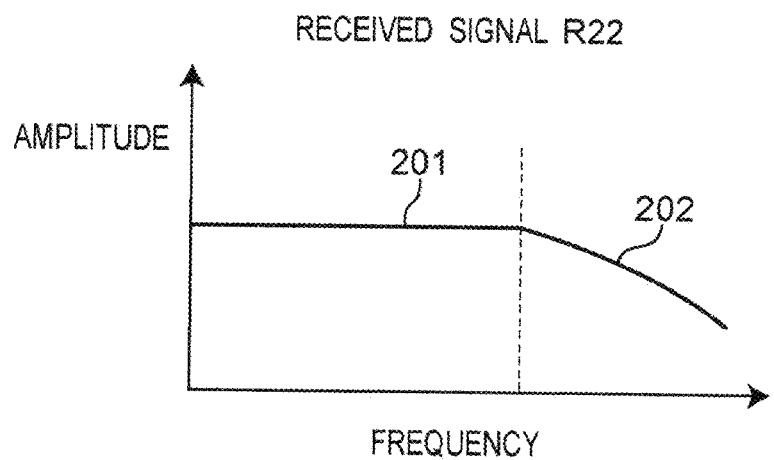
FIG. 8B is a waveform diagram of an example of a received signal R22 after the change, showing the first method of changing the transmission signal when there is noise in the modification.
Figure 9A:
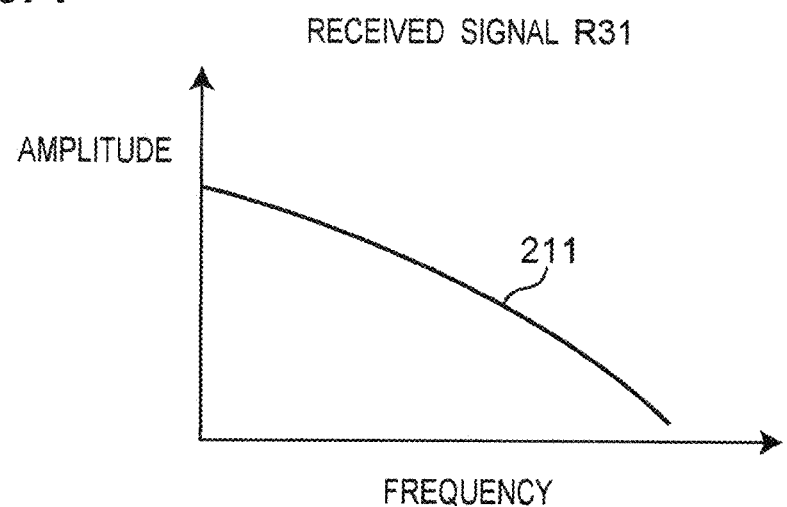
FIG. 9A is a waveform diagram of an example of a received signal R31 before a change, showing a second method of changing the transmission signal when there is noise in the modification.
Figure 9B:
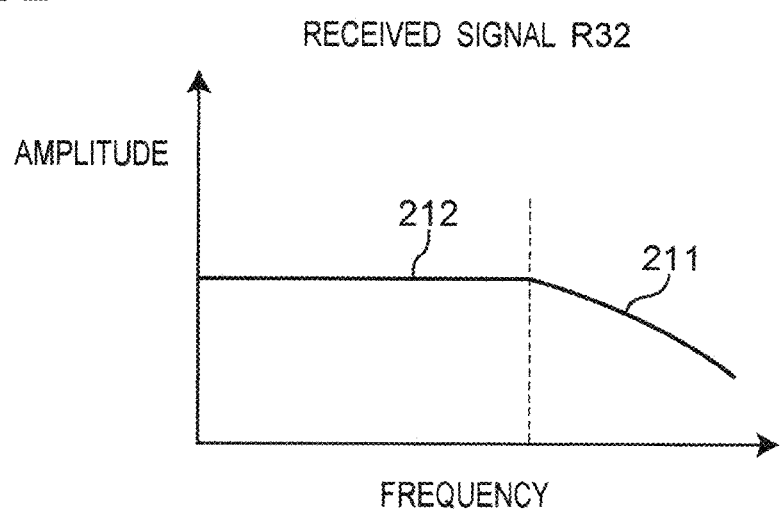
FIG. 9B is a waveform diagram of an example of a received signal R32 after the change, showing the second method of changing the transmission signal when there is noise in the modification.

FIG. 8A is a waveform diagram of an example of a received signal R21 before a change, showing a first method of changing the transmission signal when there is noise in the modification, and FIG. 8B is a waveform diagram of an example of a received signal R22 after the change, showing the first method of changing the transmission signal when there is noise in the modification. FIG. 9A is a waveform diagram of an example of a received signal R31 before a change, showing a second method of changing the transmission signal when there is noise in the modification, and FIG. 9B is a waveform diagram of an example of a received signal R32 after the change, showing the second method of changing the transmission signal when there is noise in the modification.

If there is noise and the noise cannot be separated (if the frequency of the signal passing through only the pipe and the frequency of the target signal (the signal passing through the fluid 11 such as liquid) are not different), it is determined that the signal cannot be separated in step S5 of FIG. 2, and a frequency band of transmission is changed. Here, the conditions are divided as follows.

(1) If the target signal is not attenuated (201 in FIG. 8A; that is, if a low frequency attenuation rate and a high frequency attenuation rate are substantially identical), the transmission signal is changed to the high frequency side in the next transmission, and the received signal is a signal extended to the high frequency side (202 in FIG. 8B). Alternatively, the signal may be a signal in which the frequency band of the transmission signal is shifted to the high frequency side. In this case, for example, when the transmission signal has the first band and the second band higher than the first band, the transmission signal has a third band higher than the second band of the transmission signal.

(2) If the target signal is excessively attenuated (211 in FIG. 9A; that is, if the high frequency attenuation rate is attenuated by a predetermined threshold value or more), the transmission signal is changed to a low frequency side in the next transmission. That is, the frequency band of the transmission signal may be shifted to the low frequency side, or the frequency band of the transmission signal may be extended to the low frequency side (212). In this case, for example, when the transmission signal has the first band and the second band higher than the first band, the transmission signal has a fourth band lower than the first band of the transmission signal.

As described above, the flow rate measurement apparatus according to the present embodiment can perform measurement in a simple method and reduce the measurement time as compared with the prior art. Further, in the flow rate measurement apparatus according to the modification, the flow rate can be measured with higher accuracy than the prior art even with noise.

In the above embodiment, the pipe 10 may include Teflon (registered trademark) and the fluid 11 may be a gas. In the present embodiment, a difference (discrepancy) between the attenuation rate at a predetermined ultrasonic wave frequency in the pipe 10 and the attenuation rate at the ultrasonic wave frequency in the fluid 11 is used to separate the target signal that has passed through the fluid 11 from the received signal and measure the flow rate based on the separated target signal.

In the above embodiment, a transmission method called a Z method is used to measure the flow rate, but the present invention is not limited to this. The following known reflection method called a V method (FIG. 10) or a known transmission method called an X method may be used to measure the flow rate.

Figure 10:
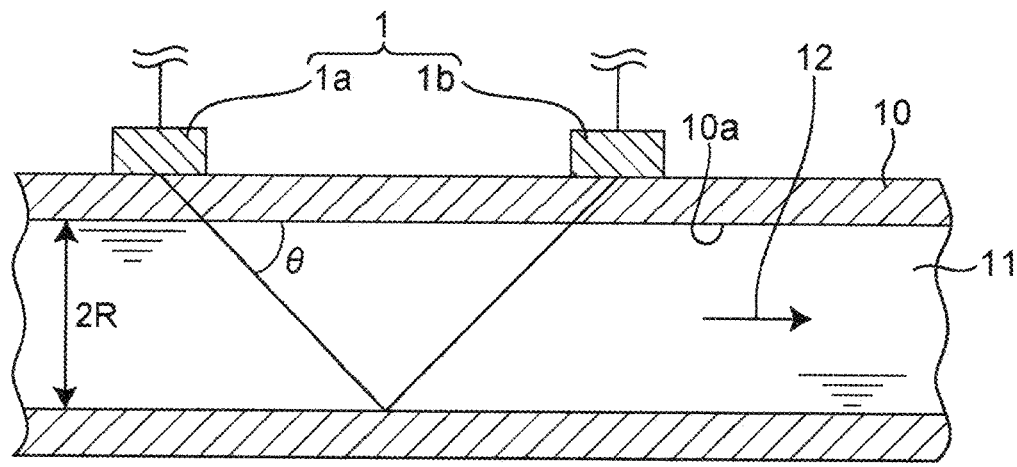
FIG. 10 is a block diagram of a partial configuration example of the flow rate measurement apparatus 50 according to the modification.

(A) Reflection Method Called V Method:

As shown in FIG. 10, the ultrasonic signal transmitted by the transducer 1a may be reflected on the inner surface of the pipe 10 and then received by the transducer 1b, or the ultrasonic signal transmitted by the transducer 1b may be reflected on the inner surface of the pipe 10 and then received by the transducer 1a, and the flow rate is measured. Here, the transducers 1a and 1b are provided at positions moved only in the longitudinal direction of the pipe 10.

(B) Transmission Method Called X Method

Figure 11:
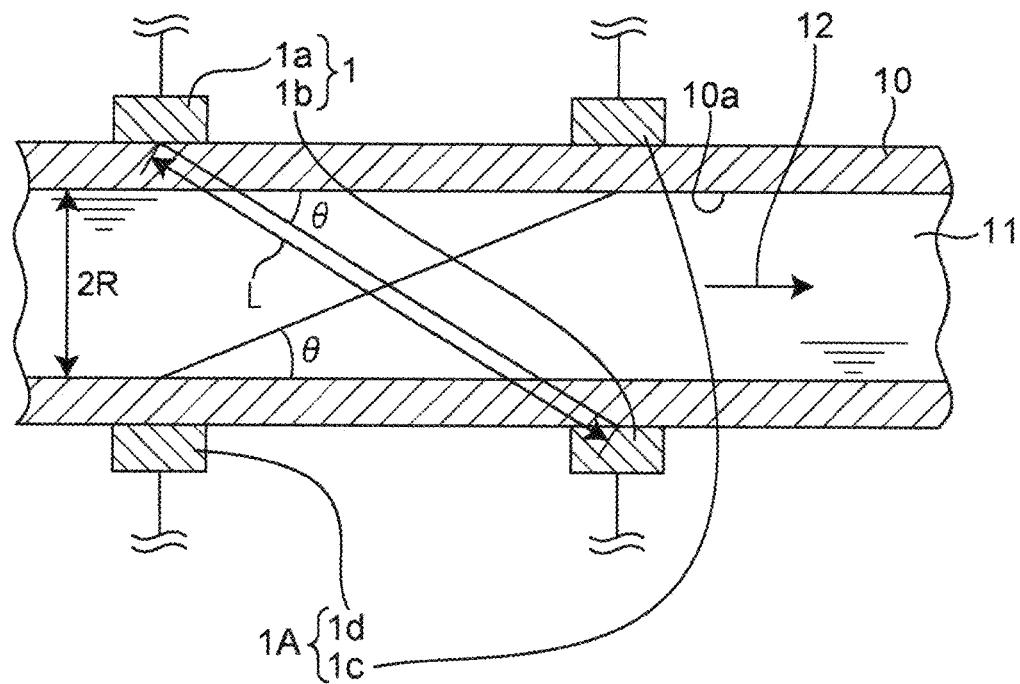
FIG. 11 is a block diagram of a partial configuration example of the flow rate measurement apparatus 50 according to the modification.

As shown in FIG. 11, the ultrasonic signal transmitted by the transducer 1a may be received by the transducer 1b via the fluid 11, or the ultrasonic signal transmitted by a transducer 1c may be received by a transducer 1d via the fluid 11, and the flow rate is measured. Here, the transducers 1a and 1c are provided at positions moved only in the longitudinal direction of the pipe 10. An ultrasonic sensor 1A includes the transducers 1b and 1d, and the transducers 1b and 1d are provided at positions moved only in the longitudinal direction of the pipe 10. The transducers 1a and 1d are provided at predetermined first positions in the longitudinal direction facing each other across the pipe 10 and the fluid 11, and the transducers 1b and 1c are provided at predetermined second positions (different from the first positions) in the longitudinal direction facing each other across the pipe 10 and the fluid 11.

In the above embodiment, for example, the transmission signal is used as the reference wave signal, but the following various reference wave signals can be used. Hereinafter, this will be described in detail with reference to FIGS. 12A to 12C and the like.

Figure 12A:
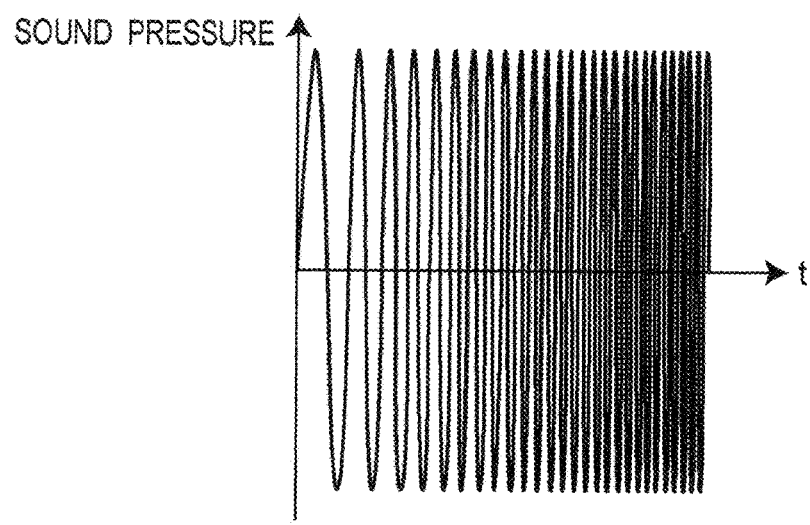
FIG. 12A is a waveform diagram of an example of a transmission signal output by a transmission signal generator 2.
Figure 12B:
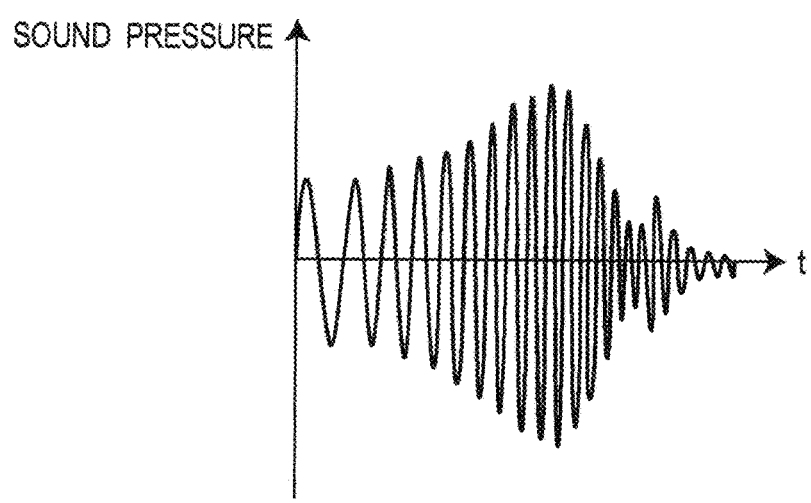
FIG. 12B is a waveform diagram of an example of a transmission signal output by a transducer 1a when the transmission signal of FIG. 12A is transmitted.
Figure 12C:
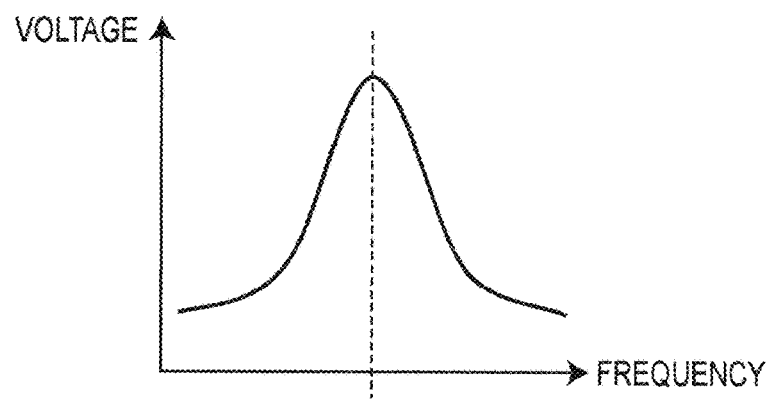
FIG. 12C is a spectrum diagram of an example of frequency characteristics of transducers 1a and 1b.

FIG. 12A is a waveform diagram of an example of a transmission signal output by the transmission signal generator 2, and FIG. 12B is a waveform diagram of an example of a transmission signal output by the transducer 1a when the transmission signal of FIG. 12A is transmitted. FIG. 12C is a spectrum diagram of an example of frequency characteristics of the transducers 1a and 1b.

A signal waveform from the transmission signal generator 2 and a signal waveform transmitted from the transducers 1a and 1b are different depending on the frequency characteristics of the transducers 1a and 1b (because the transducers 1a and 1b are configured using a piezoelectric element as a type of ultrasonic element and have a predetermined resonance frequency). The same applies to the received signal. In this case, measuring the signal waveform of the transmission signal each time leads to improvement in accuracy, but has a problem that a load on a processing circuit increases. Therefore, it is conceivable to determine the signal waveform of the reference wave signal to reduce the processing load. The signal waveform of the reference wave signal may be determined as follows.

(1) The transmission signal is monitored each time and used as the reference wave signal.

(2) The transmission signal is monitored multiple times and averaged to be used as the reference wave signal.

(3) The signal waveform from the transmission signal generator 2 is used as the reference wave signal.

(4) The reference wave signal of (3) is modified in consideration of the frequency characteristics of the transducer 1a and 1b to be used as the reference wave signal.

(5) The signal waveform of the received signal is measured in an ideal state to be used as the reference wave signal.

In the case of (4), for example, the transmission signal from the transmission signal generator 2 may be multiplied by the frequency characteristics of FIG. 12C to be used as the reference wave signal. Alternatively, the transmission signal from the transmission signal generator 2 may be changed, for example, by increasing the intensity near the resonance frequency to be used as the reference wave.

INDUSTRIAL APPLICABILITY

As mentioned as above in detail, according to the present invention, the flow rate measurement apparatus can measure the flow rate in a simple method, and reduce the measurement time as compared with the prior art. Further, even with noise, the flow rate can be measured with higher accuracy than in the prior art.

The invention claimed is:

1. A flow rate measurement apparatus comprising:
at least two transducers provided at different positions in a longitudinal direction of a pipe, the at least two transducers including first and second transducers,
wherein each of the first and second transducers that converts an electric signal into an ultrasonic signal or converts an ultrasonic signal into an electric signal,
wherein the flow rate measurement apparatus transmits an ultrasonic signal to at least one of the first and second transducers to another of the first and second transducers as a transmission signal, receives a received signal, separates a first target signal based on a correlation coefficient between the received signal and a reference wave signal which is generated based on a transmission signal, and thereafter, measures a flow rate of a fluid inside the pipe based on the target signal,
wherein the flow rate measurement apparatus further comprises:
a transmitter that transmits the transmission signal, which includes an ultrasonic signal having a band wider than the ultrasonic signal, or a plurality of ultrasonic signals having a plurality of different frequency ranges; and
a receiver that separates a second target signal passing through the fluid from the received signal by utilizing that an attenuation rate of the ultrasonic signal in the fluid in a predetermined frequency band is different from an attenuation rate of the ultrasonic signal in the pipe in the frequency band, and measures a flow rate based on the second target signal in the same manner as that of measuring the flow rate of the fluid inside of the pipe based on the first target signal.

2. The flow rate measurement apparatus as claimed in claim 1,
wherein the transmission signal has a first band and a second band higher than the first band, and
wherein the reference wave signal is set such that the second band of the transmission signal is attenuated as compared with the first band.

3. The flow rate measurement apparatus as claimed in claim 1,
wherein the transmission signal has a first band and a second band higher than the first band, and
wherein, when the attenuation rate of the ultrasonic signal in the fluid in the predetermined frequency band is identical to the attenuation rate of the ultrasonic signal in the pipe in the frequency band, and the second target signal is inseparable by the receiver, then the transmission signal has a third band higher than the second band of the transmission signal.

4. The flow rate measurement apparatus as claimed in claim 1,
wherein the transmission signal has a first band and a second band higher than the first band, and
wherein, when the attenuation rate of the ultrasonic signal in the fluid in the predetermined frequency band is larger than the attenuation rate of the ultrasonic signal in the pipe in the frequency band by a predetermined threshold value, and the second target signal is inseparable by the receiver, then the transmission signal has a fourth band lower than the first band of the transmission signal.

* * * * *